Apr. 10, 1923.
J. W. WESLEY
1,450,932
AUTOMATIC WEIGHING MECHANISM
Filed Mar. 15, 1922
2 sheets-sheet 2
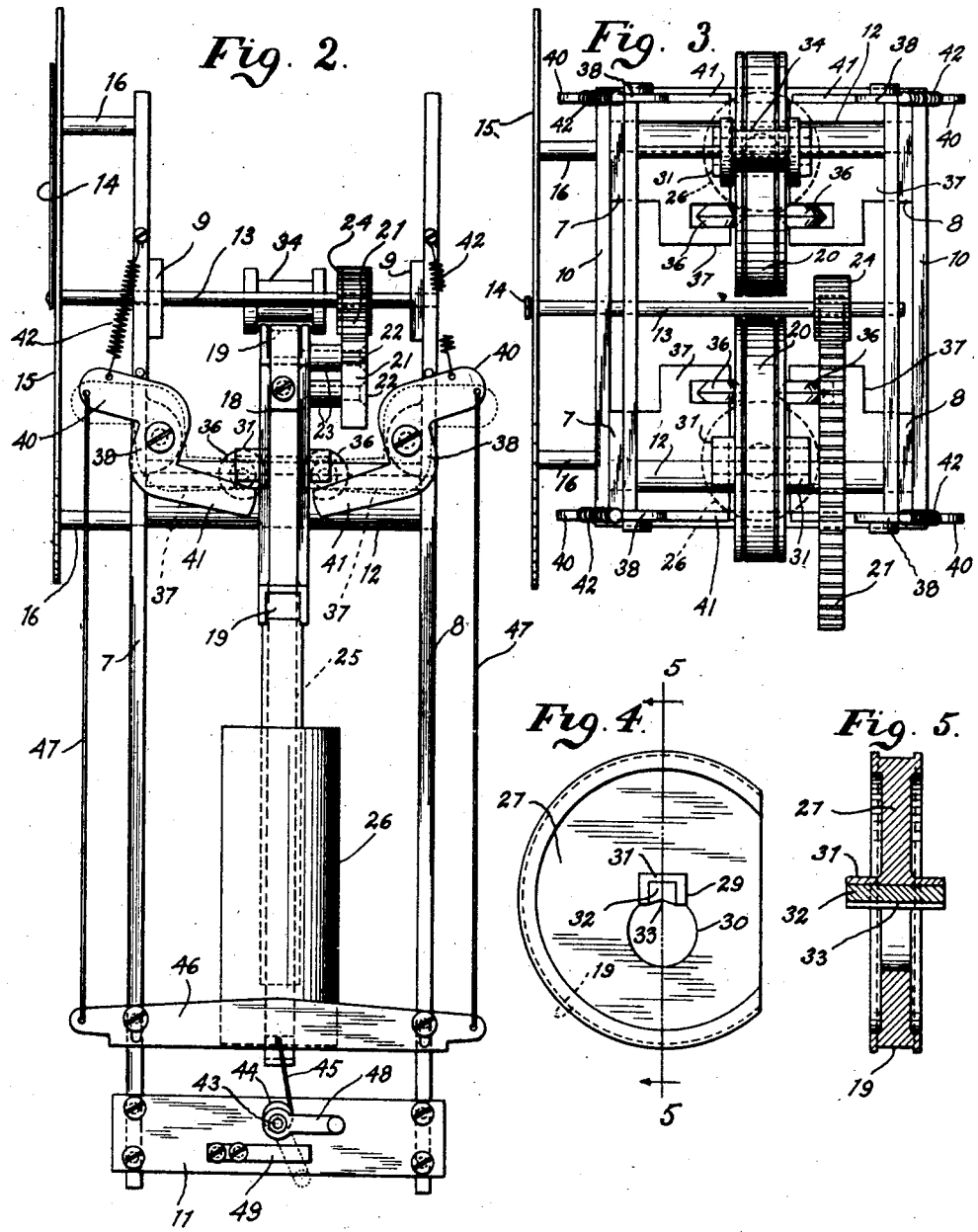
WITNESS.
O. E. Johnson
INVENTOR.
JOHN W. WESLEY.
BY Chas. C. Tillman
ATTORNEY.

Patented Apr. 10, 1923.

1,450,932

UNITED STATES PATENT OFFICE.

JOHN W. WESLEY, OF CHICAGO, ILLINOIS.

AUTOMATIC WEIGHING MECHANISM.

Application filed March 15, 1922. Serial No. 543,858.

*To all whom it may concern:*

Be it known that I, JOHN W. WESLEY, a citizen of the United States, and a resident of Chicago, in the county of Cook and State of Illinois, have invented certain new and useful Improvements in an Automatic Weighing Mechanism, of which the following is a specification.

This invention relates, generally, to weighing scales or apparatus, but particularly to an automatic weighing mechanism, which is especially intended for use in connection with weighing scales of the dial type, and it consists in certain peculiarities of the construction, novel arrangement and combination of the various parts thereof, as will be hereinafter more fully set forth and specifically claimed.

One of the objects of the invention is, the provision of a weighing mechanism which shall be simple and inexpensive in construction, strong, durable, reliable and accurate in operation, with its parts so made, arranged and co-operating one with another as to practically eliminate friction, thereby rendering the operation of the device of such sensitive character that the weight of very minute articles or objects, as well as larger ones, can be accurately ascertained and indicated by the device.

Another object is to provide a mechanism of the above mentioned general character which shall be automatic in its operation and adapted for use in either the platform or depending-scoop scales of the dial type.

Still another object is the provision of means whereby the mechanism will accurately operate without being mounted in an absolutely plumb or perpendicular position, thereby avoiding the time and care usually required in nicely positioning the scales.

A further object is to provide the mechanism with means for non-frictionally guiding or guarding parts thereof against displacement, and also for locking said parts in their operative positions when it is desired to move the device.

Other objects and advantages of the invention will be disclosed in the following description and explanation.

In the accompanying drawings which serve to illustrate an embodiment of the invention—

Fig. 2 is a side elevation of the mechanism.

Fig. 3 is a plan view thereof.

Fig. 4 is a detached side view of one of the governors of the mechanism, and

Fig. 5 is a vertical sectional view taken on line 5—5 of Fig. 4 looking in the direction indicated by the arrows.

Like numerals of reference refer to like parts throughout the different views of the drawings.

Figure 1:
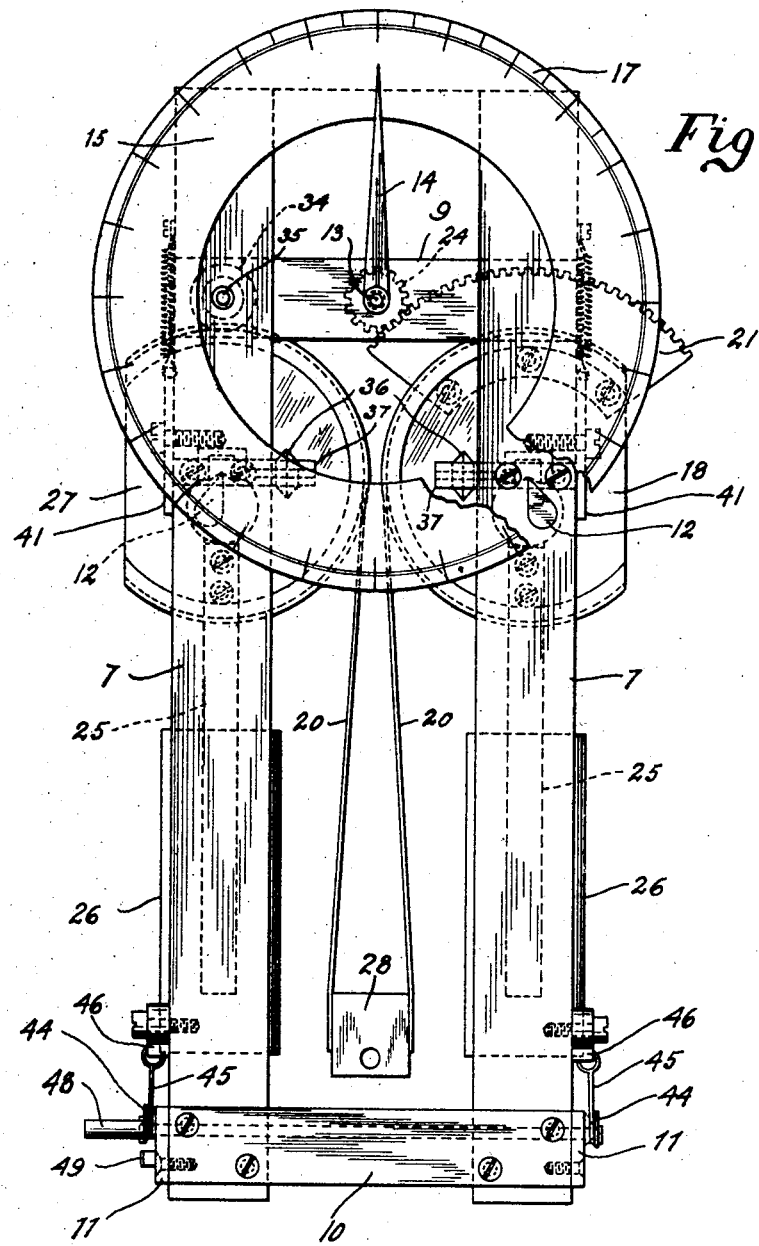
Fig. 1 is a face view in elevation of the mechanism.

The reference numeral 7 designates the front posts, and 8 the rear posts of an upright supporting frame for the parts of the mechanism, which frame is substantially rectangular in shape and said posts thereof are held in spaced relation to one another as shown, by means of a horizontally disposed brace bar 9 secured to each pair of the posts 7 and 8 near their upper ends and cross-wise with respect to the face and back of the frame. The members of each pair of the posts 7 and 8 are likewise connected together near their lower ends by similarly disposed bars 10 as will be readily understood by reference to Fig. 1 of the drawings. The front posts 7 are connected to the rear posts 8 near their lower ends by means of tie bars 11 which extend horizontally from said front posts rearwardly of the frame. The front and rear posts, are also connected between their ends by the horizontally disposed pivot bars 12 for the governors of the mechanism, which bars extend rearwardly from the front posts 7 to the rear posts 8 and are preferably seated in suitable openings in said posts of shapes corresponding to the cross-sectional shape of said bars. Thus it will be seen and understood that the posts 7 and 8 of the supporting frame are securely fastened together in spaced relation.

Horizontally journaled in the brace bars 9 about midway between the members of the front and rear pairs of posts 7 and 8 respectively is a shaft 13 which extends some distance forwardly through the brace bar 9 of the front posts 7 and has mounted on its front end an index finger or indicator 14 to cooperate with a ring-like dial 15 which is vertically mounted on the face of the front posts 7 of the frame by means of horizontally and forwardly extended rods 16 or otherwise. This dial is provided at its periphery with a graduated scale 17 of any suitable degree of graduations. The dial 15 is concentrically mounted with respect to the indicator shaft 13 so that in the movement of the indicator 14, the weight of the article being weighed, may be clearly pointed out on the scale of the dial by the indicator.

By reference to Fig. 1 it will be seen that the pivot bars 12 are substantially triangular in shape cross-sectionally and that they present their acute angles or knife edges upwardly. It will also be observed by reference to said figure of the drawing that the adjacent faces of the pivot bars 12 are located in parallelism with one another and in vertical planes, while their outer or opposite surfaces are downwardly and outwardly inclined. On one of the pivot bars 12 is mounted for oscillation or rocking movement thereon, a governor or member 18 which may be circular in shape but in the present instance is shown as being segmental for the purpose of economy in material and space. This member 18 is peripherally grooved as at 19, see Figs. 2 and 3, for the reception and operation of a ribbon or tape 20 of any suitable flexible material but preferably of rubberized tape. As shown in Figs. 1 and 2, this tape is secured at one of its ends to the upper part of the straight edge of the member 18 and extends over the member 18 inwardly thereof and within the groove or channel of said member and terminates at its other end near the lower end of the supporting frame. The member 18 carries a segmental rack 21 the arc of which is concentric to the axis of said member. The rack 21 is supported in an offset position with respect to the member 18 by means of screw-bolts 22 extended through suitable openings in the rack and engaging the member 18 near the upper portion of its periphery. To hold the rack 21 at a desired distance from the member 18, sleeves 23 surrounding the bolts 22 between the rack and said member, may be employed. This rack meshes with a pinion 24 mounted on the indicator carrying shaft 13 at a suitable point to one side of the said member. Extended downwardly from the lower portion of the member 18 is a rod 25 on the lower portion of which is mounted a weight 26 of any suitable size and material.

Mounted on the other pivot bar 12 for oscillation or rocking movement thereon, is another governor member 27 which is like the governor member 18 in every respect except that the rack 21 of the member 18 is omitted from the member 27. This last named member is mounted in alignment with the member 18 but so as not to contact therewith as is clearly shown in Fig. 3 of the drawings. A tape or ribbon 20 is secured at one of its ends to the upper portion of the straight edge of the member 27 and extended inwardly over the upper portion of the said member and then downwardly between the members 18 and 27 to a point near the lower end of the supporting frame. This last named tape or ribbon is preferably made of rubberized tape but like the other may be made of any suitably flexible material. The lower ends of the tapes are securely connected to a block 28 on which a platform or scoop for holding the articles or material to be weighed may be mounted in any suitable manner.

As before stated, the members 18 and 27 are exactly alike in construction except that the rack 21 is omitted from one of them. Each of the governor members 18 and 27 is provided centrally with a transverse opening, the upper portion of which is rectangular in shape as shown at 29, see Fig. 4, the lower portion being substantially circular in shape as shown at 30 in the last named figure. In the rectangular portion 29 of each of said openings is located a similarly shaped channeled bushing 31 which extends on each side of the governor member. Located in each of the channels of said bushings is a block or piece of agate 32 or other suitable refractory material. Each of the blocks 32 is provided in its lower surface with an inverted V-shaped groove 33 to receive the knife or upper edges of the pivot bars 12 and thus provide anti-friction bearings for the governor members.

It will be understood that the bushings 31 may be fixed to the members 18 and 27 by any suitable means and that the blocks 32 may be secured in the channels of said bushings in any suitable way. By this arrangement it is apparent that when the members 18 and 27 are operatively mounted on their respective pivot bars 12, the knife edges of said bars will rest in the grooves 33 and that the body of each bar will be located in the circular part 30 of the opening in its governor member in such a way that the walls of the circular parts of said openings will not contact with the bars 12 in the operation of the device. The governor member 27 has extended downwardly from its lower portion a rod 25 which supports a weight 26 in a similar manner to that of the governor member 18.

As the member 18 is constantly in engagement through its rack 21 with the pinion 24 on the indicator carrying shaft, said governor member 18 is not likely to be displaced on its pivot bar. To prevent displacement or movement longitudinally on the pivot bar 12 of the member 27, a peripherally grooved roller 34 mounted on a shaft 35 journaled directly above the axis of the member 27, is employed. However, it will be understood that the roller 34 is out of contact with the member 27 but is so positioned with respect to the same that any material upward movement of said member will be prevented by the body of said roller, and any material lateral movement of the member 27 prevented by the flanges of the roller 34, which flanges are located on each side of the member 27 but out of contact therewith.

As a further guard or protection against lateral movement of the members 18 and 27 on their respective pivot bars, a roller 36 having a V-shaped periphery is mounted on a horizontally disposed bracket 37 in close proximity to each face of each of the members 18 and 27, but out of contact with said members. The brackets 37 which carry the rollers 36 are mounted on the inner surfaces of the posts 7 and 8 of the supporting frame and extended horizontally and inwardly therefrom to suitable points near the face of the governor members. By this last named arrangement, it is manifest that any material lateral movement of either of the governor members in either direction will be prevented by the anti-friction rollers 36, and that should either of said members contact with one of the rollers 36, the friction caused thereby would be reduced to a minimum by reason of the knife-edge like periphery of the roller.

Pivotally mounted on the main frame at the outer side edge of each of the posts 7 and 8 of the supporting frame and slightly above the upper edges of the pivot bars 12, is a double bell crank-lever-shaped locking dog 38 each of which has an upper and outwardly extended arm 40 and a lower and inwardly extended arm 41, which latter arms are of sufficient length to contact with the faces of the governor members 18 and 27 when it is desired to lock the same. The lower arm 41 of each of the dogs 38 is held in its normal or depressed position by means of a spring 42 one end of which is secured to the upper arm 40 of the dog and the other end to a post of the main frame at a point above the dog.

Transversely journaled on the lower brace bars 11 of the supporting frame is a shaft 43 which has mounted thereon near each of its ends an eccentric 44 to each of which is secured one end of a flexible connection 45 the other end of each of which is secured to the middle portion of a cross-bar 46, see Fig. 2, mounted for vertical movement on the outside edges of the posts 7 and 8 of the supporting frame. Leading from each end of the cross-bar 46, is a rod or connection 47 each of which is united at its upper end to one of the upper arms 40 of each of the locking dogs. The shaft 43 has mounted thereon a handle 48 to be used for turning said shaft in order to cause the eccentrics 44 and their connections 45 with the cross-bars 46 to lower said bars and thereby elevate the lower arms 41 of the locking dogs into contact with the faces of the governor members. When thus positioned as shown by dotted lines in Fig. 2 of the drawings, the handle 48 will be held against movement by means of a spring catch 49 with which one of the brace bars 11 is provided for engagement with said handle. When the parts are thus held, it is apparent that the governor members will be locked against lateral movement on their pivot bars and that the device may be moved without danger of dislocating the parts of the mechanism.

From the foregoing and by reference to the drawings, it will be readily understood and clearly seen that, assuming the parts to be in their normal positions as shown in Fig. 1 of the drawings, and that the block or support 28 uniting the lower portions of the tapes 20 is equipped with a suitable support or receptacle for the article or material to be weighed, it is evident that by placing said article on such support or in such receptacle for the article or material to be weighed, its weight will be indicated by the index finger or indicator 14 pointing to the proper graduating mark on the scale of the dial. On account of the delicate manner in which the governor members 18 and 27 are poised on their respective pivot bars 12, and on account of the flexibility of the tapes or ribbons 20 which support the support carrying block or member 28, it is evident that an article or material of very light or small weight may be accurately weighed by the device. While the tapes 20 are shown as terminating a slight distance above the lower end of the supporting frame, yet this is not essential, as they may be extended through the lower end of the frame for the convenience of attaching a support to their lower portions or to the block 28 which they carry.

Having thus fully described my invention, what I claim as new and desire to secure by Letters Patent is—

1. A mechanism of the class described including in combination with a supporting frame, a pivot bar horizontally and fixedly mounted thereon, a disk-like weighted governor mounted on said bar for oscillatory movement, and a peripherally channeled roller journaled on said frame and located in close proximity to but out of contact with the periphery and faces of said governor.

2. A mechanism of the class described including in combination with a supporting frame, a pivot bar horizontally and fixedly mounted thereon, a disk-like weighted governor mounted on said bar for oscillatory movement, and a roller having a V-shaped periphery journaled on said frame in close proximity to but out of contact with each of the faces of said governor.

3. A mechanism of the class described including in combination with a supporting frame, a pivot bar horizontally and fixedly mounted thereon, a disk-like weighted governor mounted on said bar for oscillatory movement, a spring-actuated locking dog pivotally mounted on the frame on each side of said governor and normally out of contact therewith, means operably connected to said dogs whereby the same may be simultaneously caused to engage the governor, and means to lock said dogs in their engaged positions.

4. In a mechanism of the class described, the combination with a supporting frame, of a graduated scale mounted thereon, a shaft horizontally journaled on the frame, an indicator fixed on said shaft to co-operate with said scale, a pair of spaced pivot bars horizontally and fixedly mounted on said frame in parallelism with said shaft, each of said pivot bars having a vertically disposed knife edge, a weighted governor having a pivot bar receiving orifice mounted on each of said bars for oscillatory movement, gearing uniting one of said governors to said shaft, a flexible supporting member secured at one of its ends to the periphery of each of said governors and extended inwardly thereon and then downwardly therefrom, and means on said supporting members for the support of a device for holding articles to be weighed.

5. In a mechanism of the class described, the combination with a supporting frame, of a graduated scale mounted thereon, a shaft horizontally journaled on the frame, an indicator fixed on said shaft to co-operate with said scale, a pair of spaced pivot bars horizontally and fixedly mounted on said frame in parallelism with said shaft, each of said bars having a vertically disposed knife edge, a weighted governor having a transverse opening there-through provided in its upper portion with a grooved refractory bearing for cooperation with said bars and mounted on each of said bars for oscillatory movement, a pinion on said shaft, a segmental rack on one of said governors in mesh with said pinion, a flexible supporting member secured at one of its ends to the periphery of each of said governors and extended inwardly thereon and then downwardly therefrom, and means on said supporting members for the support of a device for holding articles to be weighed.

6. A mechanism of the class described including in combination a supporting frame, a pair of spaced pivot bars horizontally and fixedly mounted on said frame in parallelism with one another, a weighted governor having a transverse opening there-through for the reception of said bars and mounted on each of the same for oscillatory movement, a spring-actuated double bell crank lever shaped locking dog pivotally mounted on the supporting frame on each side of each of the governors and normally out of contact therewith, a bar horizontally mounted on the lower portion of each side of the main frame for vertical movement thereon, connections uniting the ends of said bars to the upper portions of said locking dogs, a handled shaft horizontally journaled on the main frame transversely with respect to the last named bars, an eccentric on said shaft near each of its ends, a flexible connection uniting said eccentrics and movable bars, and a spring catch mounted on the frame to engage the handle on said shaft.

JOHN W. WESLEY.